Patented Oct. 9, 1934

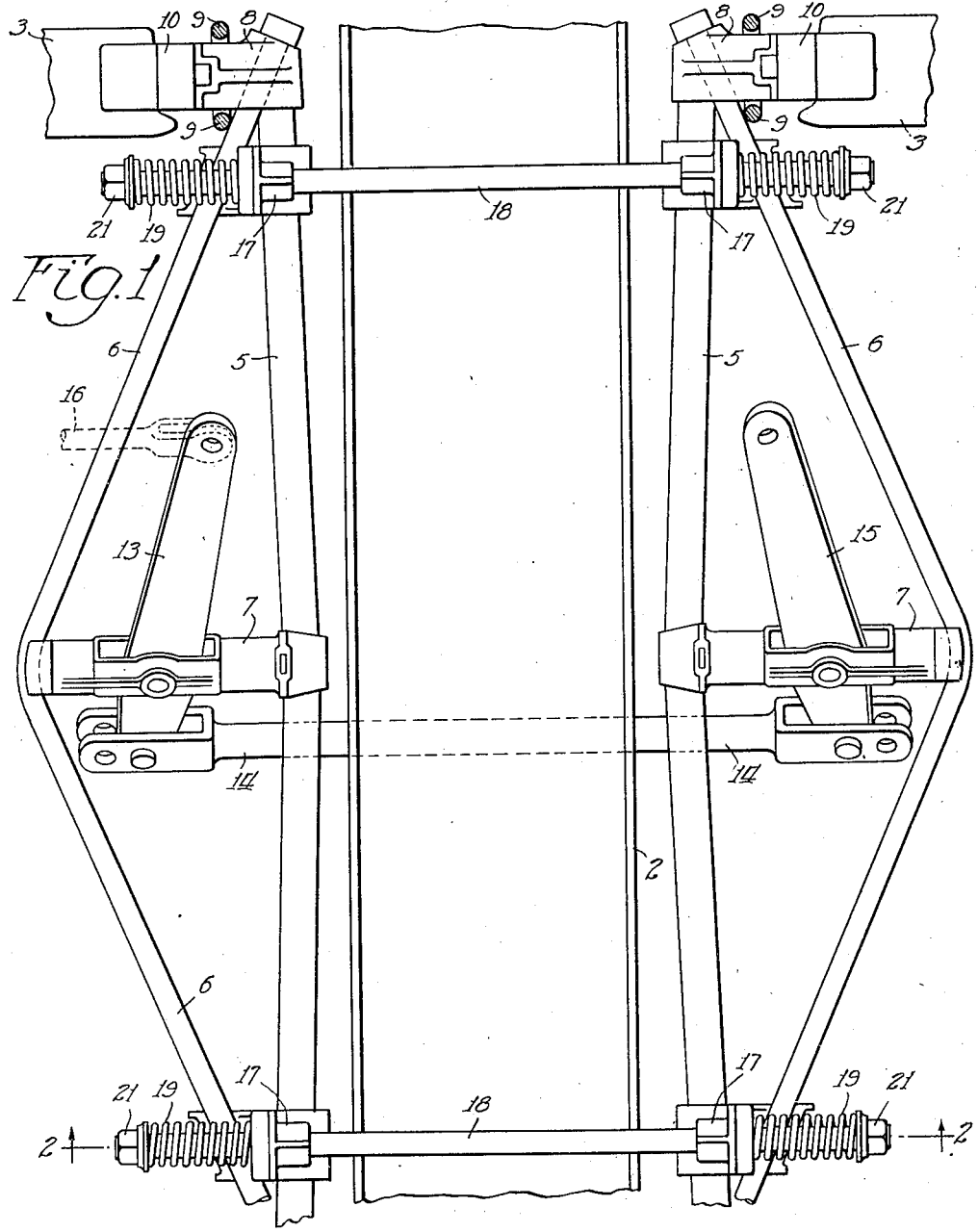

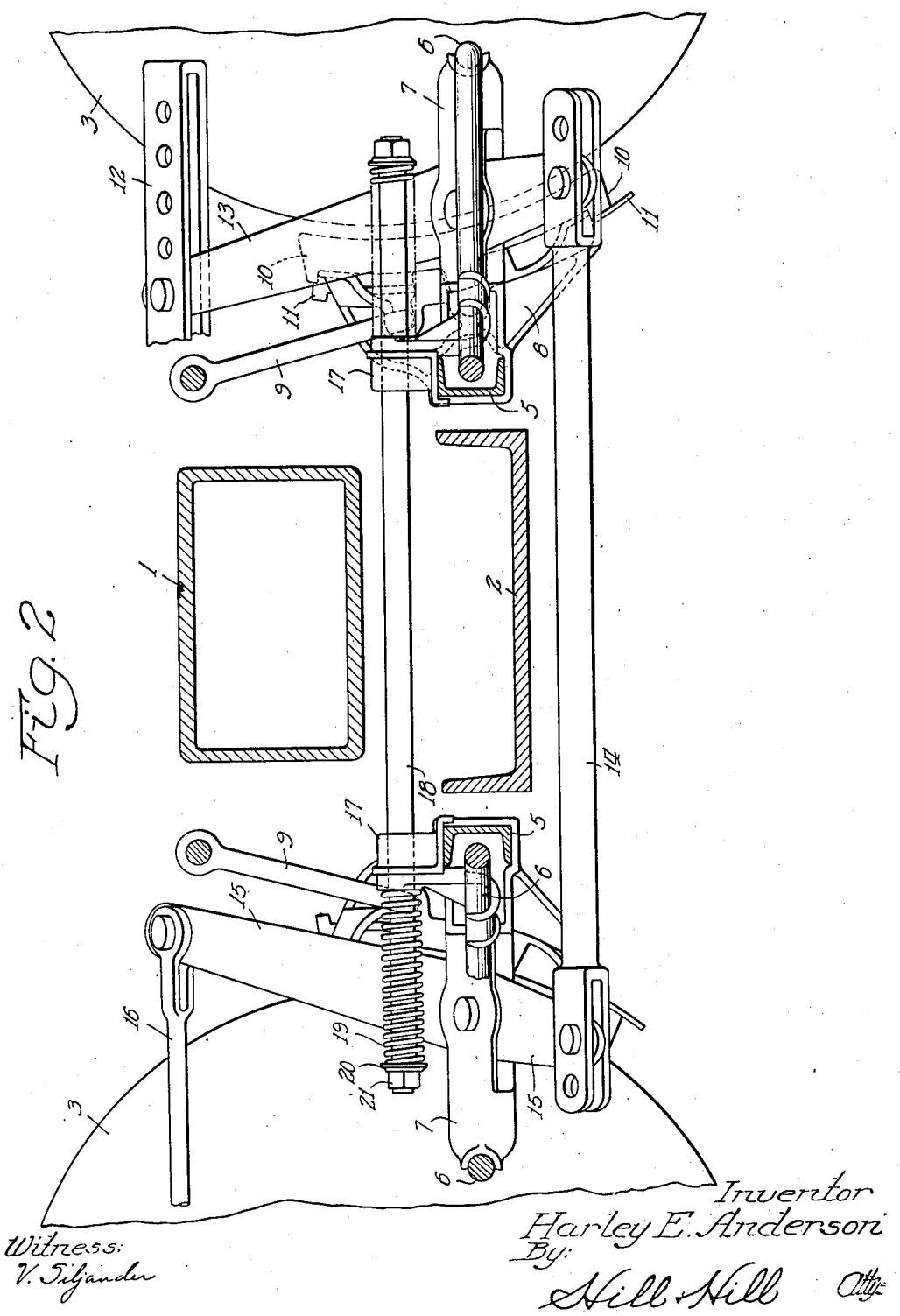

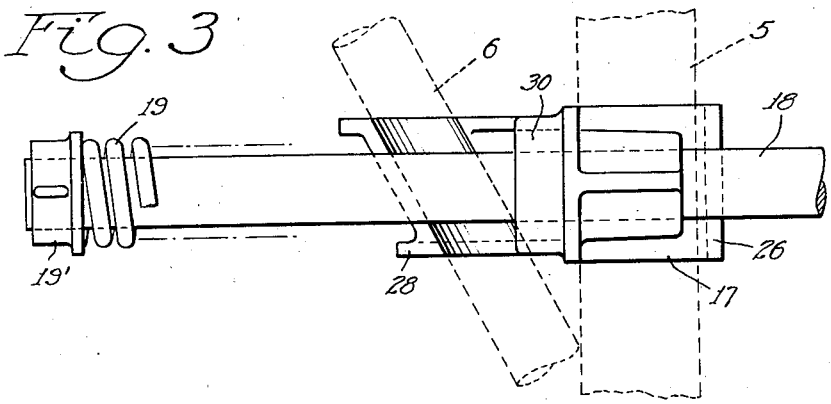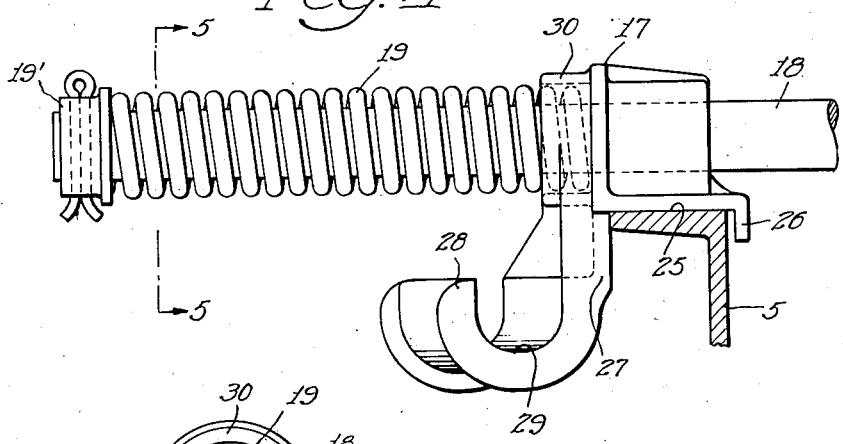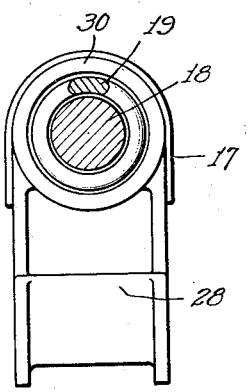

1,976,694

UNITED STATES PATENT OFFICE 1,976,694

SUPPORT FOR BRAKE BEAMS

Harley E. Anderson, Chicago, Ill., assignor to William E. Sharp, Chicago, Ill.; Minnie E. Sharp executrix of said William E. Sharp, deceased Application May 10, 1933, Serial No. 670,257

6 Claims. (Cl. 188—216)

My invention relates generally to improvements in the brake rigging on railway car trucks.

In railway car brake mechanisms as generally applied on four wheeled trucks, the brake beams lie between the wheels, are suspended from the truck side frames by suitable swinging hangers and are themselves connected to the live and dead truck brake levers, which in turn, are connected by a connecting rod so that both brake beams move in unison. In such brake mechanism the brake shoes are released from the wheels solely by gravity action (due to the fact that the brake hangers are in inclined position) and then only when the car is in motion.

When the brakes are released on a car while the car is standing, the brake shoes on all four of the brake beams remain in contact with the wheels and do not swing away from the wheels until the car is in motion because of the great amount of friction in the brake rigging. Therefore, on a train of a hundred cars or so it requires a much greater draw bar pull by the locomotive to start this train than it would if all the brake shoes were automatically released from the wheels, while the train was standing.

One object is to provide a safety guard or auxiliary hanger, for brake beams.

Also another object is to provide an automatic spring means operative to cause a quick release of the brake shoes from the wheels and for maintaining a clearance between the brake shoes and the wheels after the brakes have been released, as well as a means for maintaining the brake beams in a horizontal position and the brake heads and brake shoes in a vertical position and also a means for attaching the device to the brake beams without the use of bolts or rivets.

Another object is a guard device so arranged and positioned above the standard spring plank of the car truck so that in case of a failure of the brake hangers, the safety guard will drop down and rest on the spring plank, thereby utilizing the spring plank to support the safety guard and brake rigging to prevent the brake rigging from dropping on the tracks, all without attaching the safety guard to the spring plank.

Another object of this invention is to maintain a spring tension on the safety guards, on the brake beams and the brake connections at all times so as to reduce the wear on the parts normally caused by the swinging motion and vibration of these parts when the car to which they are attached is in motion.

Many other objects and advantages of this improvement in construction herein shown and described will be obvious to those skilled in the art.

To this end my invention consists in the novel construction, arrangement and combination of parts herein shown and described, and more particularly pointed out in the claims.

In the drawings, wherein like reference characters indicate like or corresponding parts:

Fig. 1 is a top plan view of a portion of a railway car truck showing my improved device applied thereto;

Fig. 2 is a sectional view taken substantially on line 2—2 of Fig. 1;

Fig. 3 is a plan view of a portion of my improved device;

Fig. 4 is a side elevation of the same; and

Fig. 5 is a sectional view taken substantially on line 5—5 of Fig. 4.

Referring to the drawings, a part of a standard four wheel freight car truck is illustrated, showing the application of my improved device thereto, and in which 1 designates the truck bolster and 2 the spring plank, 3 being the truck wheels. As most clearly shown in Figs. 1 and 2, the compression members of the brake beams are designated as 5 and the tension members as 6. The brake rigging is provided with the brake beam fulcrums 7, the brake beam heads 8, the brake beam hangers 9, the brake shoes 10, attached to the brake heads 8 in the usual manner by brake shoe keys 11, the dead lever guide fulcrum 12, the dead lever 13, the bottom rod 14, the live lever 15 and the brake rod 16, all of which are standard parts of the standard freight car truck construction. In Fig. 1 the bolster 1 is not shown.

Figs. 1 and 2 show my device applied to the truck and yieldingly connecting the two brake beams, while Figs. 3, 4, and 5 illustrate in detail component parts of my device. The truck shown is provided with two of the devices arranged at each side of the truck the two being identical except that the attaching members, as hereinafter described, are constructed in rights and lefts. A description of one device will suffice for both. As shown 17—17 are attaching members which are similar except that one is a right and the other a left so as to fit the brake beam and these slidably carry a rod 18. Arranged at each end of the rod are springs 19 and spring stops or abutments 21, the spring abutments being in the form of nuts which may be screwed on the ends of the rods, or caps, as shown in Figs. 3 and 4, which may be secured in place by cotter pins or the equivalent.

Each of the members 17 is preferably bored to slidably receive the rod 18 and provided with a seat 25 adapted to seat upon and be supported by the brake beam compression member 5. As most clearly shown in Fig. 4, the same is provided with a lip 26 at one side and a depending portion 27 at the other side, so that the same seats upon and embraces the member 5 of the beam and cannot move transversely on the member and become displaced. The extending portion 27 is extended downwardly and laterally and upwardly as indicated at 28 so as to form a seat 29 for the tension member 6 of the brake beam. Inasmuch as the tension member 6 extends at an angle relative to the compression member 5, the depending part of the attaching member is formed with its seat at an angle as most clearly shown in Figs. 3 and 4; it is also desirable to form the member with a spring socket by extending the part as shown at 30 so that the end of the spring is firmly seated.

Assuming now that my invention is applied to a car and the car is equipped with new brake shoes all around. When the brakes are in release position all shoes will clear the wheels about one inch or so and the compression of each spring in this position will be, say about 100 pounds each, or a total of 200 pounds on each brake beam, this compression being required to hold the brake beam and all of its connected parts (brake levers, etc.) in a horizontal position when the device pulls the beams away from the wheels. When the brake is set the compression of each spring is around 150 pounds, or 300 pounds on each brake beam, and when the shoes are completely worn out and brakes are set the compression of each spring is about 225 pounds or 450 pounds on each beam. So there is never less than 100 pounds compression on each spring or 200 pounds on each beam at any time. These compressions may of course, vary depending on the desired tension of the springs, so the pounds mentioned are for purposes of illustrations, and not by way of limitations.

In case it is necessary to replace a broken brake beam with a new one, the two spring abutments 21, one on each rod adjacent the broken beam, are removed and the rods 18 slipped back out of the attachment members 17, the attachment members can then be easily removed from the broken beam and placed on the new beam and the device connected up again as before.

Describing the objects of my invention, the safety guard hanger, consists of bars or rods of suitable dimension and material, which are extended across above the spring plank and below the truck bolster, the said bars or rods being connected at both ends to the brake beams as described, by means of attachments which seat on the compression members of the brake beams and hook underneath the tension members of the brake beams; the attachments are securely locked to the brake beams by the bars or rods slidably extending through them and by the tension of the compression springs, the springs being held in place on the bars or rods, by means of a nut, cotter pin, or any other suitable connection.

From this it will be seen that while the rods are not carried by the spring plank, they are so positioned above the spring plank that in event of the failure of the brake beam hanger, the spring plank will support the bars and the bars, in turn, support the brake rigging, to prevent its dropping down on the track.

The automatic brake release which is accomplished through a compression spring as will be seen from the accompanying illustrations, when the brakes are applied the springs are compressed, when the brakes are released the springs will expand, moving both brake beams toward the center of the truck or away from contact with the wheels. Further, I have provided compensating means for overcoming the capacity of these springs by locating the holes in the cylinder equalizer lever, so that there will be no loss in the braking power, when the brakes are applied either manually or with air.

Further, it is one of the objects of this invention, to maintain the brake beams in horizontal position and the brake shoes in vertical positions, while the brakes are not in use, to thereby prevent the brake beam and its attachments tilting forward and allowing the top of the brake shoes to rub the wheels. This is accomplished by the slidable mounting of the rods, which constitute the safety guards, through the attachment members to the brake beams, the length of the opening through the said attachment members thus forming a slidable bearing for the said rods. These slidable mountings alone or in combination with the compression springs mounted on the end of the said rods, serve as the means to prevent the brake beams and their attachments tilting forward, which when tilted, allow the top end of the brake shoes to rub the wheels, causing unnecessary friction and wear.

The method of attaching this device, using attachment members, is as follows—the attachment member is seated on top of the compression member of the brake beam and hooked underneath the tension member of the said standard brake beam, there being one attachment member at each end of each beam, the rods are then inserted through the attachment members, locking them in place against any movement from their designed position. With the springs in place, under compression, and the nuts or fastenings on the end of the rods tightened up to their proper positions, the device is then securely attached to and supported by the brake beams, but not attached to any other part of the truck, truck side frames, truck bolsters or truck spring plank.

Utilizing the truck spring plank in an emergency, to carry the load in case of a failure of the brake hanger, is accomplished without attaching any part of this invention to the spring plank, or to any other part of the truck proper, by positioning the safety guards across but above and free from contact with the spring plank from brake beam to brake beam and attached to the brake beams as described.

The compression springs provide a means for maintaining a tension on the brake beams and their attachments, they also provide a resilient means for moving the brake shoe into contact with the wheel as in the application of the brakes where the car is equipped with this invention the shoes will move forward to contact with the periphery of the wheel to the full contour of the shoe, avoiding the common experience of one end of the shoe coming in contact with the wheel first and then getting a slapping motion which breaks the brake shoes long before they are worn out.

Further, it will be seen that in case of failure of the bottom brake rod, or of the bottom brake rod being torn off by an obstruction on the track, that these tension springs would hold the brake rigging in full release position, the beams horizontal and the shoes vertical, thereby minimizing further possible damage that might occur as a result of the loose brake rigging.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. The combination in a railway car truck of the kind described having a spring plank and brake rigging including a brake beam consisting of a compression member and a tension member, of rods extending transversely over the spring plank, one adjacent each end thereof, and means for slidably carrying said rods consisting of a pair of attaching members for each rod, each attaching member consisting of a single integral part constructed to seat upon the compression member and engage opposite sides thereof and provided with a depending and laterally projecting hook-shaped part formed with an angularly extending seat closely fitting the under side of the tension member and sides thereof, a spring arranged on each rod at each end thereof, a spring abutment at each end of said rods, said springs each seating at one end on the adjacent attaching member and at the opposite end on the adjacent spring abutment.

2. The combination in a railway car truck of the kind described having a spring plank and brake rigging including a brake beam at either side of the plank, each provided with compression and tension members and brake shoes carried thereby, of a pair of rods extending transversely across and beyond the sides of and spaced above the spring plank, one at each side of the truck, means for mounting each of said rods on and connecting the brake beams consisting of a pair of attaching members for each rod connecting therewith, one member of each pair mounted on one brake beam at one side of the spring plank and the other on the brake beam at the other side of the spring plank, said attaching members each provided with integrally formed means for removably interlocking with the compression and tension members, whereby the same are retained in place solely by engagement with the compression and tension members, and spring means carried by the rod operative to move the said beams inwardly toward the spring plank to release the brake shoes when the brake mechanism is released and to yieldingly maintain the shoes in released position and prevent swinging of the brake beams when the truck is in motion.

3. In a brake rigging of the kind described, a pair of brake beams each including compression and tension members, a spring plank, said brake beams swingingly mounted one on each side of said spring plank, and a brake beam positioning member yieldingly connecting the brake beams and located above the spring plank, the one-piece attachment member seated on the top of each compression member and hooked underneath the adjacent tension member of the brake beam, and each locked securely to its respective brake beam by the positioning member extended therethrough.

4. An attachment for brake rigging including brake beams each consisting of a compression member and a tension member, the central portion of said tension member spaced from the compression member with its ends extending angularly to and connected to the ends of the compression member, said brake beams being arranged on opposite sides of the spring plank of the car, attachment members arranged at each end of each brake beam consisting of a one-part member formed with a recessed seat to rest upon the top of the compression member and with a depending laterally extending hook underlying the tension member and having on its upper side an angularly extending seat constructed to closely fit the tension member, whereby when said attaching members are inserted in operative position the same is prevented from moving lengthwise the compression member both inwardly and outwardly, and rods extending through and yieldably connecting said attachment members and locking the same in place.

5. A car construction appliance for connecting brake beams which each include a compression member and a tension member and in which the tension member is spaced at its center portion from the compression member with its ends extending angularly from its center toward and connected to the adjacent ends of the compression member, consisting of rods extending between the beams and attaching members for slidably connecting the rods to the beams, each attaching member consisting of a single integral part provided on its under side with a seat for engagement with the top face of the brake beam compression member and having a lip at one side engaging one side of the compression member, and a depending portion at the other side engaging the opposite side of the compression member, said depending portion terminating in a laterally extending part provided with an angularly disposed hook having a seat of a size to underlie the tension member and engage and closely fit the under side thereof.

6. In a brake rigging of the kind described, a pair of brake beams and hangers therefor, each brake beam including compression and tension members and brake shoe members carried thereby, a spring plank, said brake beams swingingly carried in their hangers one on each side of said spring plank, and a brake beam positioning member yieldingly connecting the brake beams and located above the spring plank, attachment members for said positioning member arranged one at each end thereof, each attachment member consisting of a one-piece part seated on the top of a compression member and provided with a hook projected underneath the adjacent tension member of the brake beam, said attachment members each being operable to trunnion on the tension member, whereby when the beam is lowered to a position other than its normal working position with the positioning member carried by the spring plank, the brake beam may freely position itself and be carried by the positioning member at an angle to permit normal operation of the brake shoes and of the brake rigging.

HARLEY E. ANDERSON.